UNITED STATES PATENT OFFICE.

KARL ELBEL, OF BIEBRICH, GERMANY, ASSIGNOR TO THE FIRM OF KALLE & COMPANY, AKTIENGESELLSCHAFT, OF BIEBRICH, GERMANY.

PROCESS OF CONDENSING REDUCTION PRODUCTS OF ACENAPHTHENE-QUINONE, &c.

965,170.  Specification of Letters Patent.  Patented July 26, 1910.

No Drawing.  Application filed January 4, 1910. Serial No. 536,428.

*To all whom it may concern:*

Be it known that I, KARL ELBEL, doctor of philosophy and chemist, subject of the King of Prussia, residing at Biebrich-on-the-Rhine, in the German Empire, have invented certain new and useful Improvements in the Manufacture of New Reduction Products of Acenaphthene-Quinone and Their Transformation into Condensation Products, of which the following is a specification.

Graebe and Gfeller have reduced acenaphthene-quinone by means of zinc dust and glacial acetic acid and have thus obtained acenaphthenone (*Annalen*, vol 276, 1893, page 12). This body is not capable of condensation with indoxyl or 3-oxy-1-thionaphthene.

I have now found that new derivatives of acenaphthene or reduction products of acenaphthene-quinone are obtained if the reducing action is not carried as far as in Graebe's and Gfeller's experiment, but rather if the acenaphthene-quinone is treated with mild reducing agents.

The first reduction product, which is preferably produced by the action of alkaline reducing agents (such, for instance, as alkali sulfid, ammonia, or caustic soda lye and zinc dust, grape sugar and caustic soda lye) on acenaphthene-quinone, is characterized by the following properties: It is very difficultly soluble in water. With alkalies it forms salts which are of a deep blue color and almost insoluble in water. In glacial acetic acid it partially dissolves, acetylization taking place. On heating with aqueous bisulfite, both the free compound and its difficultly soluble salts are converted into a bisulfite compound which is, however, decomposed by both acids and alkalies. The new compound can be crystallized out of ethane tetrachlorid in the form of fine yellowish prisms melting at 248° centigrade. The compound can be condensed with 3-oxy-1-thionaphthene the yield being no homogeneous body but a mixture of various products part being coloring matter.

By reduction in acid, neutral or alkaline media the compound is converted into a second stage reaction product. But the latter may also be produced starting immediately from acenaphthene-quinone. The compound so obtained is soluble in water and it forms, with alkalies, two groups of salts which are readily soluble in water. With little alkali it gives colorless or but feebly blue-colored salts which are converted by an excess of alkali, into deep violet-blue-colored salts. With magnesia, only a feebly colored or colorless salt is produced. The new compound can be crystallized out of alcohol and in the form of thin acicular crystals, having a melting point of 254° centigrade. On boiling with glacial acetic acid acetylization takes place. With bisulfite, under the same conditions, a bisulfite compound is formed, which is decomposed by alkalies or acids. This second reduction product does not form any more coloring matter when combined with indoxyl or 3-oxy-1-thionaphthene. It yields homogeneous compounds, the alkali salts of which are easily soluble in water, and do not possess in themselves the characteristics of coloring matters, but which are very easily converted into valuable dyes by oxidizing agents for instance by the oxygen of the air.

The products obtained in this manner may be employed in the textile industry for the production of dyes on the fiber. If the dyer impregnates a fabric with an alkaline solution of these products and afterward exposes it to an oxidizing action, for instance to that of the air, a dye is formed on the fibers. These coloring matters are identical with those formed by the condensation of acenaphthene-quinone with 3-oxy-1-thionaphthene or indoxyl.

The object of my invention is now to transform acenaphthene-quinone into a reduction product and to combine this with 3-oxy-1-thionaphthene or indoxyl and derivatives of either of them forming homogeneous compounds not possessing the characteristics of coloring matters but yielding such when oxidized on the fiber.

In order to describe the manner in which my invention may be carried out I give the following example.

20 kilograms of acenaphthene-quinone, after being moistened and ground with commercial alcohol, are introduced, in small portions, at a time, during from one to two hours, into a mixture of 200 kilograms of iron filings or trimmings, 500 liters of water, and 10 kilograms of 50 per cent. acetic acid, the mixture being heated to from 80° to 90° centigrade and well stirred.

The mixture is kept at the same temperature and stirred continuously for another hour until the quinone has entirely disappeared. The mixture is then rendered alkaline by carbonate of sodium, 150 kilograms of common salt are then added and the whole is allowed to cool and is filtered. The residue, freed, as fár as possible, from the lye, is extracted with boiling alcohol. The alcoholic extract thus obtained is, after the addition thereto of 15 kilograms of 3-oxy-1-thionaphthene and 5 kilograms of a 10 per cent. solution of sodium carbonate, boiled for from one to three hours at the reflux condenser, air being excluded. The alcohol becomes slightly violet and the resulting leuco compound separates for the greater part in slightly colored crystals. After distilling off the alcohol, a reddish product is obtained which dissolves in hot diluted caustic soda lye free from air, a vat liquor, of a red-violet color, being formed.

The above example describes a process for making the new product, but my invention is not limited to this example which may be carried out within wide limits.

For condensation with the reduced product also the derivatives of 3-oxy-1-thionaphthene as well as indoxyl and derivatives thereof may be employed.

Now what I claim is:

1. As a new process the manufacture of new condensation products not possessing in themselves the characteristics of coloring matters from 3-oxy-1-thionaphthene or indoxyl or derivatives of either of them on one side and a reduction product of acenaphthene-quinone on the other side, by treating acenaphthene-quinone with mild reducing agents until a water soluble colorless body is formed yielding easily soluble alkali salts, which are of a violet-blue color, in presence of an excess of caustic alkali, and by condensing this reduction product with indoxyl, 3-oxy-1-thionaphthene or derivatives of either of them.

2. As a new product the compound from the reduction product of acenaphthene-quinone, which is colorless, soluble in water and yields soluble deep violet-blue-colored alkali salts in presence of an excess of caustic alkali with a molecular quantity of 3-oxy-1-thionaphthene, which is colorless or almost colorless powder almost insoluble in water, difficultly soluble in alcohol, yielding with aqueous alkalies reddish-violet solutions of its salts which are decomposed again by acids, an almost colorless precipitate of the original condensed body being formed.

In testimony whereof I have signed my name to this specification in the presence of two subscribing witnesses.

KARL ELBEL.

Witnesses:
 JEAN GRUND,
 CARL GRUND.